(12) United States Patent
Eilertsen

(10) Patent No.: US 8,411,413 B2
(45) Date of Patent: Apr. 2, 2013

(54) HIGH VOLTAGE EDLC CELL AND METHOD FOR THE MANUFACTURE THEREOF

(75) Inventor: Thor E. Eilertsen, Oneonta, NY (US)

(73) Assignee: Ioxus, Inc., Oneonta, NY (US)

( * ) Notice: Subject to any disclaimer, the term of this patent is extended or adjusted under 35 U.S.C. 154(b) by 1109 days.

(21) Appl. No.: 12/229,922

(22) Filed: Aug. 28, 2008

(65) Prior Publication Data
US 2010/0053844 A1   Mar. 4, 2010

(51) Int. Cl.
    *H01G 9/00*   (2006.01)
(52) U.S. Cl. .......................... 361/502; 361/503
(58) Field of Classification Search ........... 361/502–503
     See application file for complete search history.

(56) References Cited

U.S. PATENT DOCUMENTS

| | | |
|---|---|---|
| 3,819,340 A | 6/1974 | Heier et al. |
| 4,383,897 A | 5/1983 | Gillich et al. |
| 4,683,516 A | 7/1987 | Miller |
| 5,093,762 A | 3/1992 | Sato et al. |
| 5,126,017 A | 6/1992 | Nakama et al. |
| 5,150,283 A | 9/1992 | Yoshida et al. |
| 5,618,318 A | 4/1997 | Reddy et al. |
| 5,621,602 A | 4/1997 | Winkelmann |
| 5,667,909 A | 9/1997 | Rodriguez et al. |
| 5,723,231 A | 3/1998 | Wu et al. |
| 5,729,427 A | 3/1998 | Li et al. |
| 5,776,628 A | 7/1998 | Kraft et al. |
| 5,850,331 A | 12/1998 | Matsumoto et al. |
| 5,862,035 A | 1/1999 | Farahmandi et al. |
| 5,907,472 A | 5/1999 | Farahmandi et al. |
| 5,968,210 A | 10/1999 | Strange et al. |
| 6,038,123 A | 3/2000 | Shimodaira et al. |
| 6,045,942 A | 4/2000 | Miekka et al. |
| 6,045,943 A | 4/2000 | Nowaczyk |
| 6,059,847 A | 5/2000 | Farahmandi et al. |
| 6,084,766 A | 7/2000 | Jerabek et al. |
| 6,094,788 A | 8/2000 | Farahmandi et al. |
| 6,099,600 A | 8/2000 | Yan et al. |
| 6,201,686 B1 | 3/2001 | Hiratsuka et al. |
| 6,212,059 B1 | 4/2001 | Uchikawa et al. |
| 6,233,135 B1 | 5/2001 | Farahmandi et al. |
| 6,246,569 B1 | 6/2001 | Strange et al. |
| 6,320,740 B1 | 11/2001 | Saito et al. |

(Continued)

FOREIGN PATENT DOCUMENTS

| JP | 1-253910 | 10/1989 |
|---|---|---|
| JP | 1-310523 | 12/1989 |

(Continued)

OTHER PUBLICATIONS

International Preliminary Report on Patentability for International Application No. PCT/US2008/077460, issued Mar. 30, 2010, 6 pages.

(Continued)

*Primary Examiner* — Eric Thomas

(57) ABSTRACT

An EDLC device in which the double layer capacitors themselves are produced lithographically. The resultant EDLC can be of any capacitance and voltage combination for a particular application. The entire lithographically formed entity can be housed in a single container and rated according to its capacitance and voltage standoff characteristics. Through material control processes, the electrochemical composites developed onto the current collector is unilaterally equalized, providing the desired distributed voltage standoffs, thus promoting the ability to design high voltage independent cells without the normal electronic balancing circuitry associated with multiple series-connected electrochemical cells.

22 Claims, 9 Drawing Sheets

U.S. PATENT DOCUMENTS

| | | |
|---|---|---|
| 6,376,123 B1 | 4/2002 | Chu |
| 6,379,402 B1 | 4/2002 | Suhara et al. |
| 6,379,835 B1 | 4/2002 | Kucherovsky et al. |
| 6,426,863 B1 | 7/2002 | Munshi |
| 6,430,031 B1 | 8/2002 | Dispennette et al. |
| 6,451,073 B1 | 9/2002 | Farahmandi et al. |
| 6,456,484 B1 | 9/2002 | Matsuoka et al. |
| 6,493,209 B1 | 12/2002 | Kamath et al. |
| 6,515,845 B1 | 2/2003 | Oh et al. |
| 6,594,139 B2 | 7/2003 | Muffoletto et al. |
| 6,614,647 B2 | 9/2003 | Kamath |
| 6,616,875 B2 | 9/2003 | Lee et al. |
| 6,714,402 B2 | 3/2004 | Kamath |
| 6,721,168 B2 | 4/2004 | Takeuchi et al. |
| 6,758,868 B2 | 7/2004 | Munshi |
| 6,762,926 B1 | 7/2004 | Shiue et al. |
| 6,793,692 B2 | 9/2004 | Sato et al. |
| 6,967,183 B2 | 11/2005 | Hampden-Smith et al. |
| 6,985,352 B2 | 1/2006 | Norton |
| 7,087,348 B2 | 8/2006 | Holman et al. |
| 7,092,239 B2 | 8/2006 | Nakazawa et al. |
| 7,173,808 B2 | 2/2007 | Hirata et al. |
| 7,180,725 B2 | 2/2007 | Takeuchi et al. |
| 7,198,654 B1 | 4/2007 | Kim et al. |
| 7,211,345 B2 | 5/2007 | Hampden-Smith et al. |
| 7,273,597 B2 | 9/2007 | Takeuchi et al. |
| 7,382,600 B2 | 6/2008 | Paul et al. |
| 7,394,648 B2 | 7/2008 | Kondo et al. |
| 7,400,490 B2 | 7/2008 | Gunderman et al. |
| 7,541,782 B2 | 6/2009 | Narendra et al. |
| 2003/0049538 A1 | 3/2003 | Buerger et al. |
| 2003/0172509 A1 | 9/2003 | Maletin et al. |
| 2003/0192170 A1 | 10/2003 | Jan et al. |
| 2004/0062989 A1 | 4/2004 | Ueno et al. |
| 2004/0085710 A1 | 5/2004 | Takeuchi et al. |
| 2004/0152832 A1 | 8/2004 | Kirchmeyer et al. |
| 2005/0231893 A1 | 10/2005 | Harvey |
| 2006/0115717 A1 | 6/2006 | Schubert et al. |
| 2006/0130300 A1 | 6/2006 | Kobayashi et al. |
| 2006/0164790 A1 | 7/2006 | Takeuchi et al. |
| 2006/0222952 A1 | 10/2006 | Kono et al. |
| 2006/0274475 A1 | 12/2006 | Chiba |
| 2007/0001651 A1 | 1/2007 | Harvey |
| 2007/0015061 A1 | 1/2007 | Klaassen |
| 2007/0022590 A1 | 2/2007 | Hirano et al. |
| 2007/0076349 A1 | 4/2007 | Dementiev et al. |
| 2007/0111093 A1 | 5/2007 | Kashiwagi et al. |
| 2007/0218365 A1 | 9/2007 | Takezawa et al. |
| 2007/0223178 A1 | 9/2007 | Fujino |
| 2007/0224516 A1 | 9/2007 | Deguchi et al. |
| 2007/0254221 A1 | 11/2007 | Lee et al. |
| 2008/0003166 A1 | 1/2008 | Maletin et al. |
| 2008/0013253 A1 | 1/2008 | Thrap et al. |
| 2008/0013254 A1 | 1/2008 | Miller |
| 2008/0028583 A1 | 2/2008 | Shimoyama et al. |
| 2008/0044727 A1 | 2/2008 | Suzuki et al. |
| 2008/0063931 A1 | 3/2008 | Zucker |
| 2008/0089011 A1 | 4/2008 | Tasei et al. |
| 2008/0111110 A1 | 5/2008 | Ma et al. |
| 2008/0266754 A1 | 10/2008 | Kazaryan et al. |
| 2009/0080141 A1 | 3/2009 | Eilertsen |
| 2009/0109600 A1 | 4/2009 | Reddy et al. |
| 2009/0141422 A1 | 6/2009 | Bourcier |
| 2009/0279230 A1 | 11/2009 | Eilertsen et al. |

FOREIGN PATENT DOCUMENTS

| | | | |
|---|---|---|---|
| JP | 3-101211 | | 4/1991 |
| JP | 03094412 A | * | 4/1991 |
| JP | 7-201675 | | 8/1995 |
| JP | 7-240347 | | 9/1995 |
| JP | 1-326145 | | 11/2001 |
| JP | 6-121000 | | 5/2006 |
| WO | WO 99/24995 | | 5/1999 |

OTHER PUBLICATIONS

International Search Report and Written Opinion for International Application No. PCT/US2009/055299, mailed Apr. 1, 2010, 8 pages.

International Search Report and Written Opinion for International Application No. PCT/US2008/077460, mailed on Feb. 27, 2009, 8 pages.

International Search Report and Written Opinion for International Application No. PCT/US2009/043259, mailed on Dec. 18, 2009, 9 pages.

Office Action for U.S. Appl. No. 11/903,929, mailed on Jan. 7, 2010, 7 pages.

Office Action for U.S. Appl. No. 12/006,476, mailed on Nov. 18, 2009, 13 pages.

Chinese Office Action for Application No. 200980140297.9, mailed Apr. 5, 2012, 6 pages.

* cited by examiner

HIGH VOLTAGE EDLC CELL AND METHOD FOR THE MANUFACTURE THEREOF

RELATED APPLICATIONS

The present application is related to co-pending U.S. patent application Ser. No. 12/151,811 for ELECTRODE STRUCTURE FOR THE MANUFACTURE OF AN ELECTRIC DOUBLE LAYER CAPACITOR, incorporated by reference herein in its entirety.

FIELD OF THE INVENTION

The present invention relates to high voltage electrochemical double layer capacitors (EDLCs) and, more particularly, to a prototype design, manufacturing methods and materials to create electrodes for a high voltage EDLC, while maintaining high capacitance and low resistance thereof.

BACKGROUND OF INVENTION

An electrochemical double layer capacitor (EDLC) is an energy storage device consisting of two electrodes arranged in such a manner that one acts as the cathode and the other the anode, creating a structure that may be modeled as two capacitors in series. The device is characterized by a high power density whose value is dictated by the effective series resistance (ESR) of the device; the lower the ESR, the higher the power density. The capacitance of these devices is very large due to the effective surface of the activated carbon used to fabricate an EDLC and the spacing between the electrode and the molecules of the electrolyte that form the double layers. Indeed, an EDLC may be modeled as a conventional parallel plate capacitor using the effective surface area of the activated carbon for the surface and the molecular distance between the electrode and the electrolyte molecules as the spacing between the parallel plates. Capacitance is calculated by the formula $C=kA/d$, where k is a constant of proportionality, A is the effective surface area, and d is the spacing between the plates.

EDLC devices are typically manufactured by encasing the electrodes and separator material in a package, usually an aluminum housing, which is wetted with electrolyte and sealed. The resulting device is a single cell EDLC device. These devices are used in a wide variety of applications including but not limited to industrial power supplies, UPS (uninterrupted power supplies), electric vehicles, cell phones, and in many electronic appliances.

The current generation of EDLCs operates with a nominal voltage rating of approximately 2.7 volts, a limitation imposed by virtue of the electrolyte. This requires that for many applications, many EDLC cells are required to meet the needs of a particular application. Except for devices that work at or below 2.7 volts, one or more EDLC devices are used in series to provide a composite device that operates at a higher voltage. For a specific application, a series-parallel configuration is often needed, but can include inherent problems. For example, as the number of cells increases in a series configuration, it is necessary to address cell balancing to prevent premature failure of the composite device. This approach is frequently expensive and cumbersome. The configurations are also large and heavy due to many individual cells used to form the composite structure.

SUMMARY OF INVENTION

In accordance with the present invention, there is provided a single cell composite device designed to use a large number of individual cells in a single package, thus producing a "single cell" EDLC device with a higher voltage standoff than that of conventional EDLCs and that is lighter in weight, smaller in volume, and inherently free of complications that arise from cell balancing. The EDLC has a unit cell structure with alternately interleaved electrodes formed lithographically and a preformed separator disposed between the electrodes and impregnating an electrolyte therein. The unit cell has preformed electrodes with contained individual components specific to each electrode. The components are placed in precise intervals to develop a double layer effect. Extensions of individual blocks are also provided, containing additive capacitance, interfaced by allowing extra lengths of current collector to one of the electrodes and continuing forward with component placement or by sonic welding or by heat (spot) welding the extension pieces together.

BRIEF DESCRIPTION OF THE DRAWINGS

A complete understanding of the present invention may be obtained by reference to the accompanying drawings, when considered in conjunction with the subsequent, detailed description, in which.

DETAILED DESCRIPTION OF THE PREFERRED EMBODIMENT

The invention includes manufacturing steps for a single high voltage EDLC cell having characteristics associated with EDLC modular equipment associated with many subassembly components. An example capacitance of at least 58 farads and a stable voltage withstanding tolerance of 15 volts is used hereinbelow. It is not intended that this example be taken as a standard; rather, it should be understood this is an arbitrary choice to illustrate the concept. The methodology may be extended to virtually any other capacitance and voltage stack.

The electrode and electrode assembly structures are described in great detail because of their critical importance to the manufactured product. Other factors of importance are preparation, component design, component application sequence, electrode manipulation, block interface coupling, thermal component dissipaters, and packaging.

Figure 1:
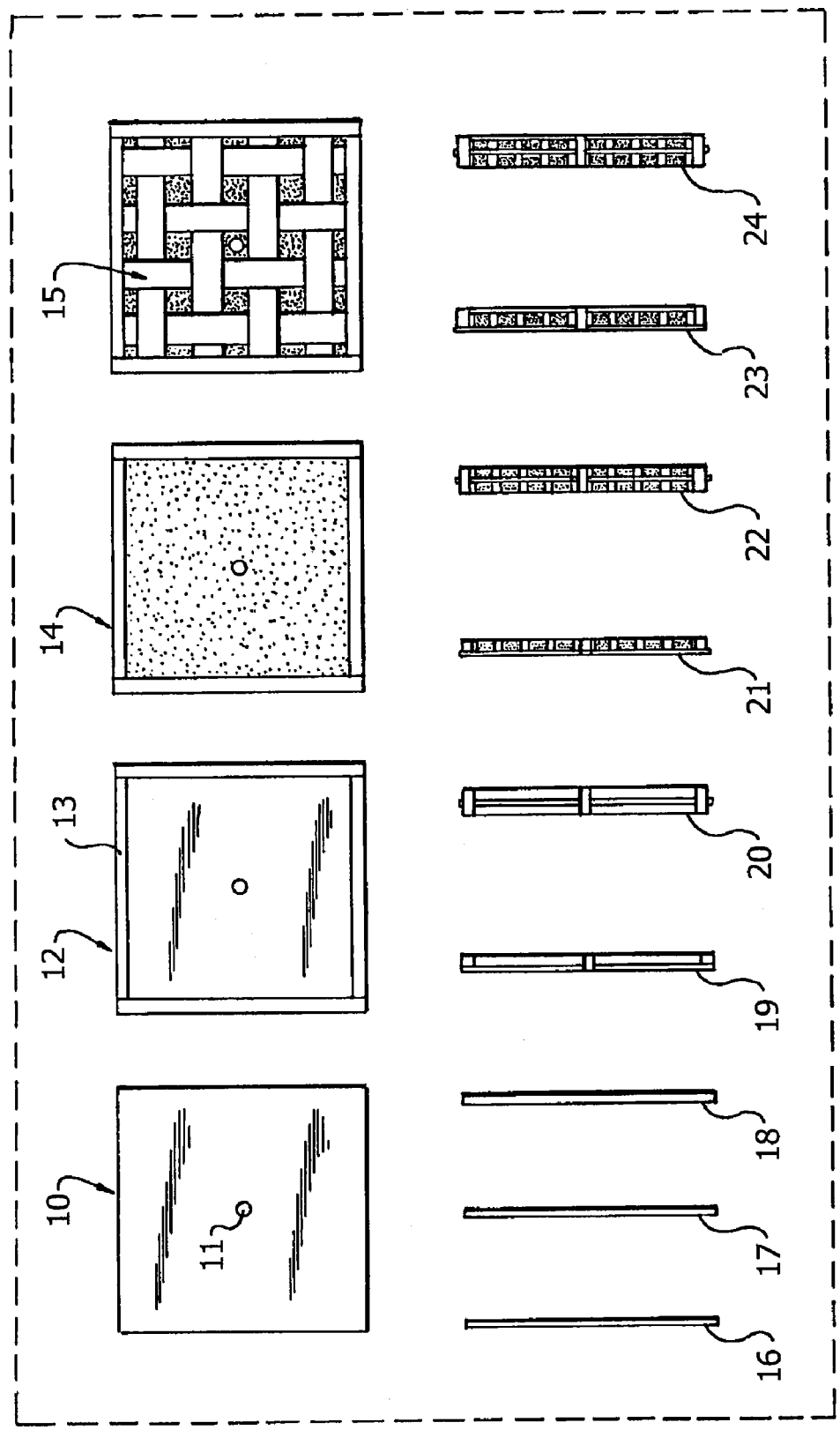
FIG. 1 shows the basic component shapes used in staging the various areas of the electrodes in accordance with the present invention, identification of material thickness being indicated on the bottom of the Figure.

FIG. 1 shows the layer and component definition on the electrodes. Plan views of the manufacturing stages of the electrodes are identified by reference numerals 10-15, shown on the upper portion of the Figure, while the respective cross-sectional thickness of single and double layer electrodes are identified by reference numerals 16-24, shown on the lower portion of the Figure. A current collector 10, 16 is made from capacitor grade aluminum, which is 99.99% pure aluminum, available in sheets, which for this example is 30 µm thick and 50 mm×50 mm for ease of handling, material application and electrochemical properties.

A hole 11 is first drilled into the center of the collector work area. It is imperative the aluminum is cleaned prior to drilling, since aluminum, when exposed to an oxygen atmosphere, forms contaminates that impede material from intimately contacting its surface. Chemical etchant baths are typically used for removing these oxides, but quick response to the intended application after its removal must be ensured since the oxide layer reforms in a matter of minutes. Plasma etching is preferred to provide a continuous ride through of aluminum strip material, allowing for the immediate component application. The plasma etcher is the first process step in building the applied components onto the current collector 10, 16.

Individual electrochemical cells have a finite voltage standoff due to the electrolyte's breakdown limit, which is generally in the range of 2.5-2.7 volts. Compartments are formed representing leak-proof areas for the electrolyte within the EDLC cell structure. These compartments are essential in the manufacturing of a high voltage series stacked EDLC. Required properties such as operating temperature, surface adhesion, flexibility, and chemical solubility can be found in a PVDF material such as Solef 1008, manufactured by Solvay-Solexis. Gasket 12 can be formed onto the current collector 13, gasket 12 having a thickness 19 of less than 100 µm for a single side and less than 170 µm for a double sided component 20. The application of Solef 1008 can be through a lamination process or screen printing, the latter being the preferred method. Building a detailed wall of material around the perimeter of the current collector 13 with a controlled thickness of single and double electrodes, respectively 19, 20, which is specifically immune to decay from electrolyte exposure, prevents any leakage from occurring.

Figure 2:
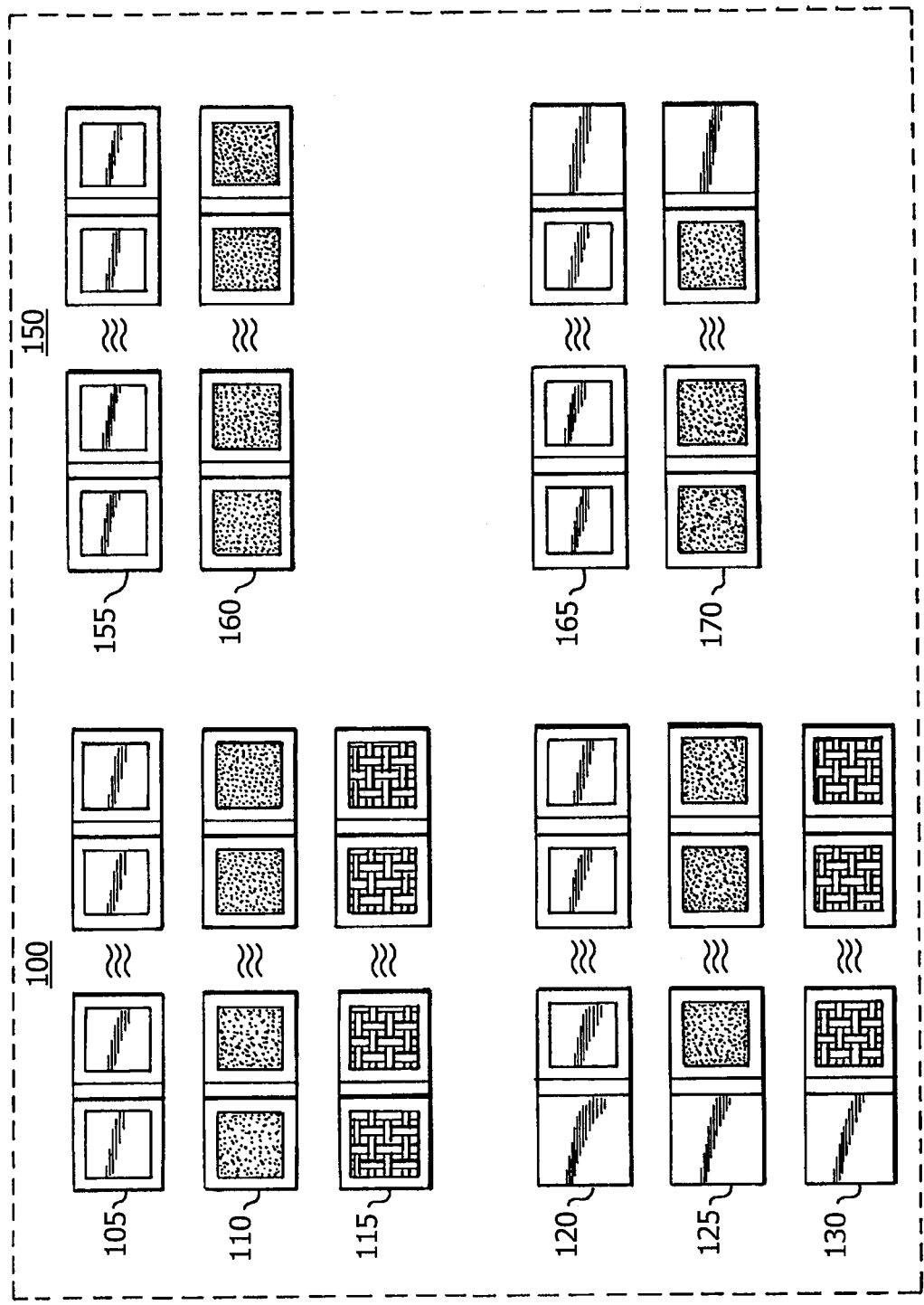
FIG. 2 shows one typical component selection and specific placement thereof.

FIG. 2 details lithographic component plates, showing front 105-115 and back 120-130 sides of two different electrodes 100, 150. Each PVDF component is sequentially applied onto the current collector, one electrode front 105, and one back 120 until the required components are completed. The second electrode 150 front 155, and back 165 is fabricated in similar fashion.

Differing applications dictate the relative importance of power vs. energy density. The manufacturing process may be adjusted to accommodate either; as the requirement for energy is increased, the thickness of carbon material is increased and so do the adhesive thicknesses of the PVDF component. The aluminum area underneath the adhesive can be perforated with micro holes to transfer the adhesive through the sides of the electrode. This tends to stabilize the adhesive wall area that extends above the aluminum base.

Activated carbon, the predominant ingredient in an EDLC carbon electrode, provides the massive exposed surface areas required to create the capacitive storage in high voltage EDLC applications. The volume contained within activated carbon is proportional to the specific capacitance, which is typically determined by the carbon manufacture. Calculations of the products of length, width, thickness and specific capacitance define the capacitance for one double layer electrode component area. Depending on the structural size and organization of these component areas, orienting length, width and thickness in parallel or series compartments provides greater capacitance and/or voltage standoff capability, respectively.

Building on the technical engineering merits of the aforementioned Renewable Energy Development Inc. co-pending U.S. patent application Ser. No. 12/151,811, a carbon slurry is utilized in conjunction with a specifically manufactured casting machine. The slurry is applied to the electrode current collector 14 (FIG. 1). The slurry is composed primarily of activated carbon, smaller quantities of conductive carbon, binders, fillers and other additives. Mixed in proper proportions and in specific orders, half mixing with itself and with a solvent yields the correct batch combination in order to apply repeated uniform thin coating to the current collector. The slurry mixture has enhanced electrical properties that reduce the bonding resistance and increases the capacitance of the slurry promoting a unique cast component solution.

A suitable casting machine, not shown, is adjusted so the precise coating thickness 18, indicative of the required capacitance, can be attained at the required component location. As the aluminum current collector is fed through the casting machine, already having the walled PVDF material deposited 19, 20, depending on the number of components required, carbon components are deposited in precision increments, as single sided 21 and double sided 22 (FIG. 1). FIG. 2 shows the components positioned on the first electrode front 110 and back 125, along with the second electrode front 160 and back 170.

In order to maximize the working voltage of the EDLC device, a proton conductor or separator must be positioned between individual polarized electrodes in order to electrically isolate but not chemically separate the plates and to allow only specific charged ions to pass through. The separator is also able to store a limited amount of free electrolyte not absorbed into the activated carbon. It is important to consider the required properties needed to determine the proper separator for the high voltage EDLC cell.

The separator undergoes high mechanical stress, both in vertical and horizontal directions, as the EDLC is charged and discharged in operation. The separator adds its own resistive quantities measured as a constant in one direction or the opposite direction, and as some reactive component as a frequency dependent quantity. In all cases, the separator requires careful attention to its construction. Some materials perform their best if the device is constructed prior to assembly. These types of material are readily available from manufactures such as Celgard and NKK. The parameters are predefined and operate as tested under those conditions. These types of material separators can be physically applied as they are being manufactured or they can be laminated prior to assembly. For this invention a screening process at the point of application is preferred, since precession location, material concentration, spacing, sizing and adaptability are important parameters.

An example PVDF material that can be used to manufacture such a separator is Solef 6020 made by Solvay-Solexis. This can be screen printed 15 onto the prepared, dried carbon component as a separate process. Desirable properties include: a maximum applied thickness of 25 µm, a pore size of 25 to 50 µm with an evenly distributed pore size distribution (PSD) and a homogenous separator matrix composition. Depending on the power or energy requirements of the final high voltage EDLC, the screening application process can compensate for other material or manufactured defects. A single sided electrode 23 with screened separator and a double-sided electrode 24 with screened separator component are shown in FIG. 1.

The screening of the separator onto the electrode is the last fundamental step in the electrode manufacturing process. The separator must be as thin as possible but yet able to provide sufficient isolation to keep the electrodes from shorting together. Only one separator is required between each electrode assembly so alternate placement from the screening applicator may be possible. FIG. 2 shows a screen method described as one electrode front 115 and back 130. In this arrangement the second electrode need not have a screened-on separator. If the second electrode die requires a screened-on separator the separator screening can be applied onto both electrodes on both front and back sides. With this arrangement the screened separators alternate components so that every other one has a separator screened onto the cast carbon material. The components are thus arranged as follows: cast carbon, cast carbon+separator, cast carbon, cast carbon+separator, etc.

As the electrode components are processed, when one side is completed, the second side begins, making it necessary to pay close attention to the positioning of the first side components. This can be monitored with sufficient precision using optical sensors, not shown, positioned on the machine. As each cast and screened layer is applied, drying time can be modified, longer or shorter as the electrode is wound onto a large round drum that may be oil heated to maintain a satisfactory drying temperature. The large drum may also be considered a storage vehicle allowing more material in a smaller length of area and not condensing it into a compact reel thus possibly damaging the integrity of the PVDF gaskets and cast carbon material.

The order of component construction is important because misplaced operations can create premature failure of the high voltage EDLC. Another reason for the proper order is the importance of component placement in relation to whether this particular block orients itself to capacitive addition or voltage interface stacking. The processes occurs as follows: aluminum strips cut to length, hole drilling, plasma cleaning, electrode first side PVDF gasket application, second side PVDF gasket application, carbon cast first side, carbon cast second side, apply separator to first side, and apply separator to second side.

Figure 3:
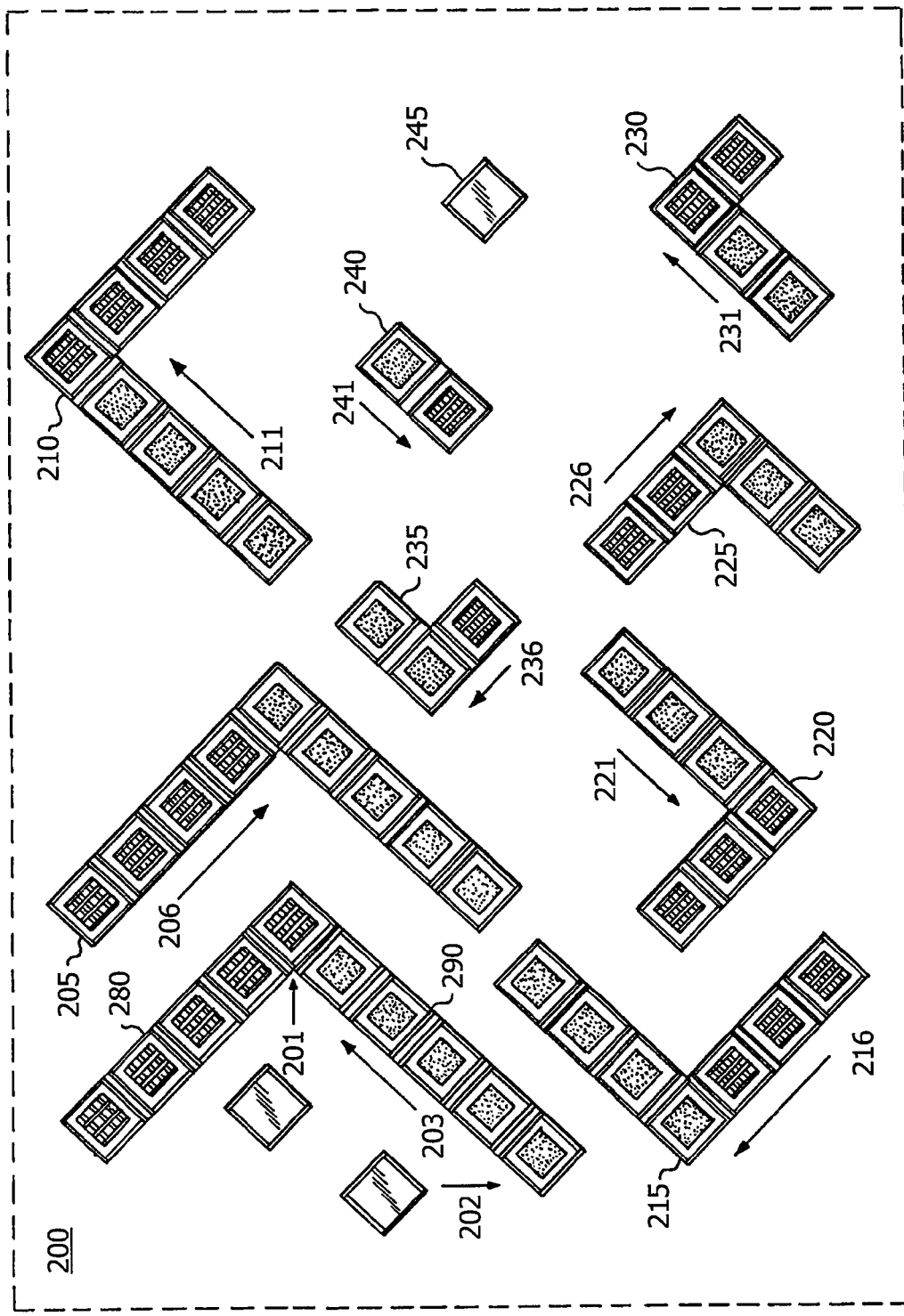
FIG. 3 illustrates the folding organization patterns needed to complete each cell sequentially.

Detailed information as to how the electrode components are assembled into the high voltage EDLC are referenced initially by the sample 90 degree lithographic component folding scheme shown in FIG. 3. The first electrode 280 comprises elements 115 and 130 (FIG. 2) and the second electrode 290 comprises elements 160 and 170 (FIG. 2) arranged 90 degrees offset from each other 200, both electrodes 280, 290 having the respective front sides facing up.

The folding pattern demonstrates how individual components are aligned but is not indicative of the capacitance to be utilized in the 58F 15 volt invention example. Beginning with folding pattern 200 of electrode 280, the first bottom component 201 has bare aluminum ready for block assembly, described hereinbelow. Initially electrode 290 slides down on top of electrode 280 forming the first double layer component. The next fold 205 moves electrode 206 over electrode 290 forming the second double layer component. The third fold 210 moves section 211 over electrode 280. This becomes a repeating operation until the last folding pattern 240, folds 241 over and the operation is complete with the bottom component 245 of electrode 290 on top of the additive capacitive block.

As each of these electrode assemblies is built, it is targeted for specific sections, being defined as block and block interface coupling areas. The most straightforward is the block area. In this area, the two electrodes are intertwined, coupling the carbon-to-carbon interface together with only one thin separator sandwiched between them. Alternately as each electrode is advanced, it is folded 90 degrees to the second electrode with each electrode being placed down parallel to the other. Every second time an electrode is placed down, an additive capacitive component is created. As long as each electrode is interfacing in this parallel fashion with continuous lengths of current collector matching, the capacitance is additive.

At the beginning of the electrode, a carbon mass-free aluminum current collector component is provided. This also occurs at the very end of the completed EDLC block. These bare aluminum segments, at least on one side, when the EDLC is first connected to a positive and negative power source, act as the terminal interface.

Figure 4:
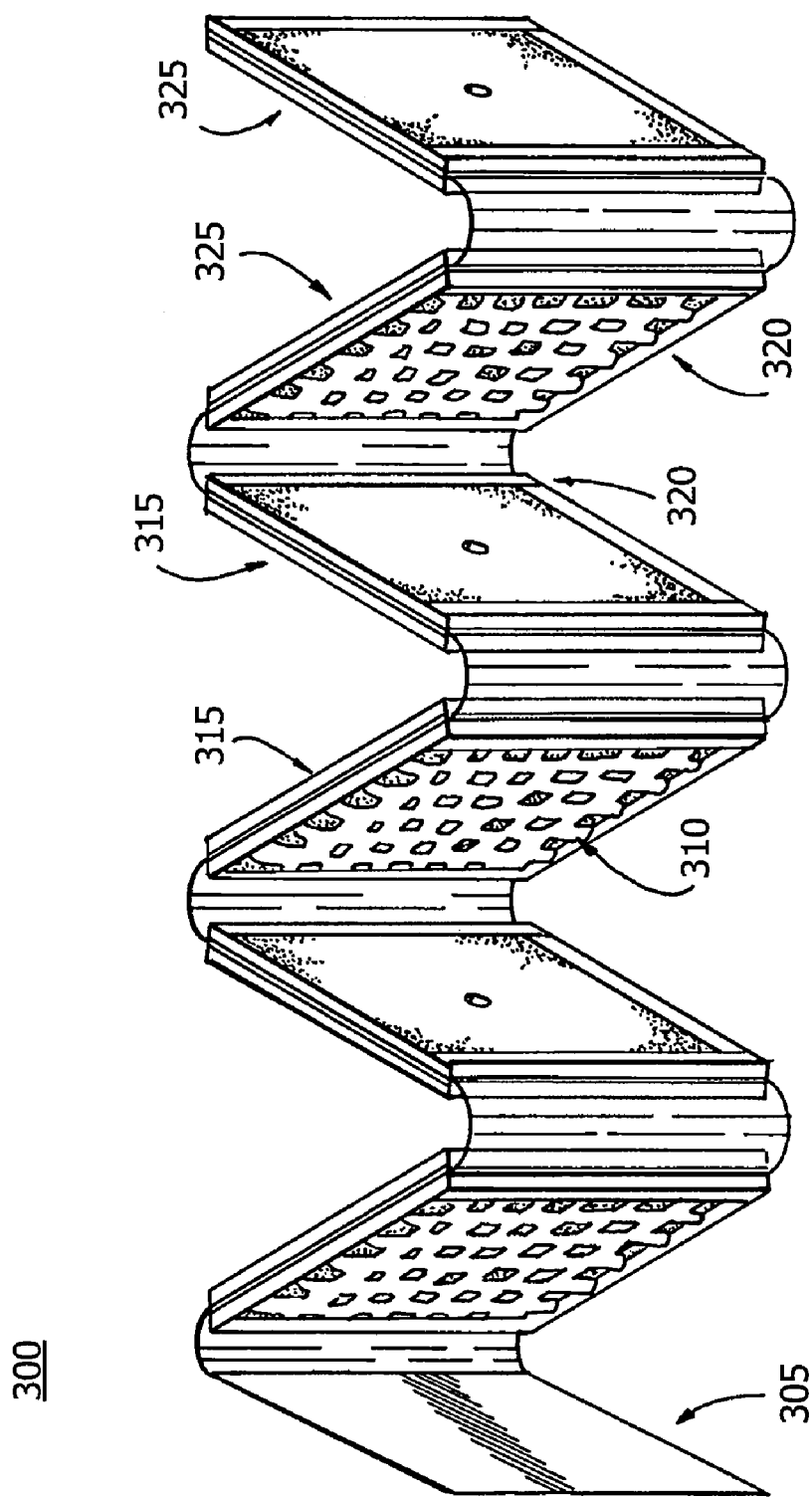
FIG. 4 displays an open view of one electrode, the component patterns being shown in sequence from front to back side, indicating how they appear when folded.

FIG. 4 shows a single electrode capacitive segment folding view 300, indicating layer detail. One side of the segment is free from material including components 305 or both sides, depending on the application and desired termination method. Considering only one electrode side exposed, the other side may have components consisting of carbon mixture only or an additional component such as the separator.

Figure 5:
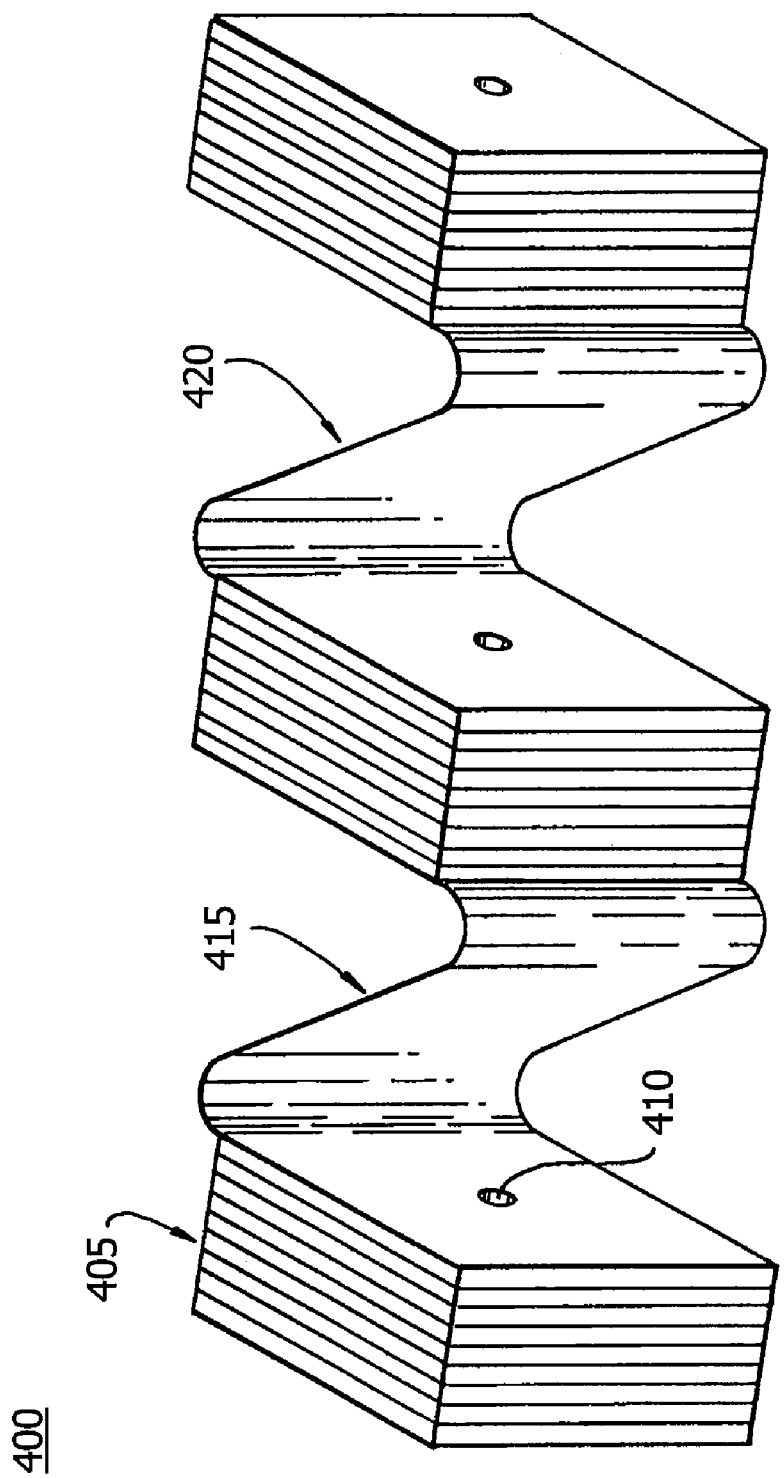
FIG. 5 shows the block structure of the high voltage stack and the interface components needed to stack the voltage into increments.

In FIG. 5, as the first block of components 400 is coming to a close 405, and the requirement for a second block exists because the voltage stacking has not been accomplished, a block to block interface 415 is needed. Here it is necessary to ensure the initial starting electrode is not extended further, but the second electrode is extended. A serial block-to-block interface includes the second of two electrodes extended 415 and 420. As the second electrode is extended to meet the next block, several options can be considered. The current collector segment can be left short only to connect to the next upper block 420 by ultrasonic welding the two together. Second, the current collector is continued further into the second block 415, and components added to satisfy the makeup of the next start of components of the block, as shown in FIG. 2. The resulting concatenated linkage(s) enable the voltage dividing necessary to be able to stack up to the complete EDLC voltage requirement. The maximum length of these interfacing electrodes can be two block lengths long.

For each component area, whether the component contains carbon material or carbon material and separator insulator, a small hole 410 is associated with it. These holes allow the electrolyte to be filled throughout the enclosed cavity, to permeate the porous activated carbon, and saturate the separator. Since these holes are thru-connected per block only and each block remains at its own potential, the end holes must be plugged after the electrolyte fill. In order to ensure a complete fill and to keep the oxygen level as low as possible, the block is first evacuated and back filled, replacing the vacuum with nitrogen allowing no air contaminates to linger, forming a premature breakdown in the electrolyte when refilled. Once the nitrogen has saturated the carbon and separator material, the process is reversed, allowing the electrolyte to replace the nitrogen. Sealing can be provided with Solef 1008, formed into a slug and injected into the block through the holes. As the plug is injected it is heated first to expand the material entering into the cavity and then cooled to provide a smooth thin outline on the exterior of the cavity.

There can be as many individual components in a block as needed to obtain the required capacitance. The interface between blocks should be keep as short as possible, no more than one component in length. There can be as many of the block interface sections as needed to supply the voltage standoff required for a particular application.

Figure 6:
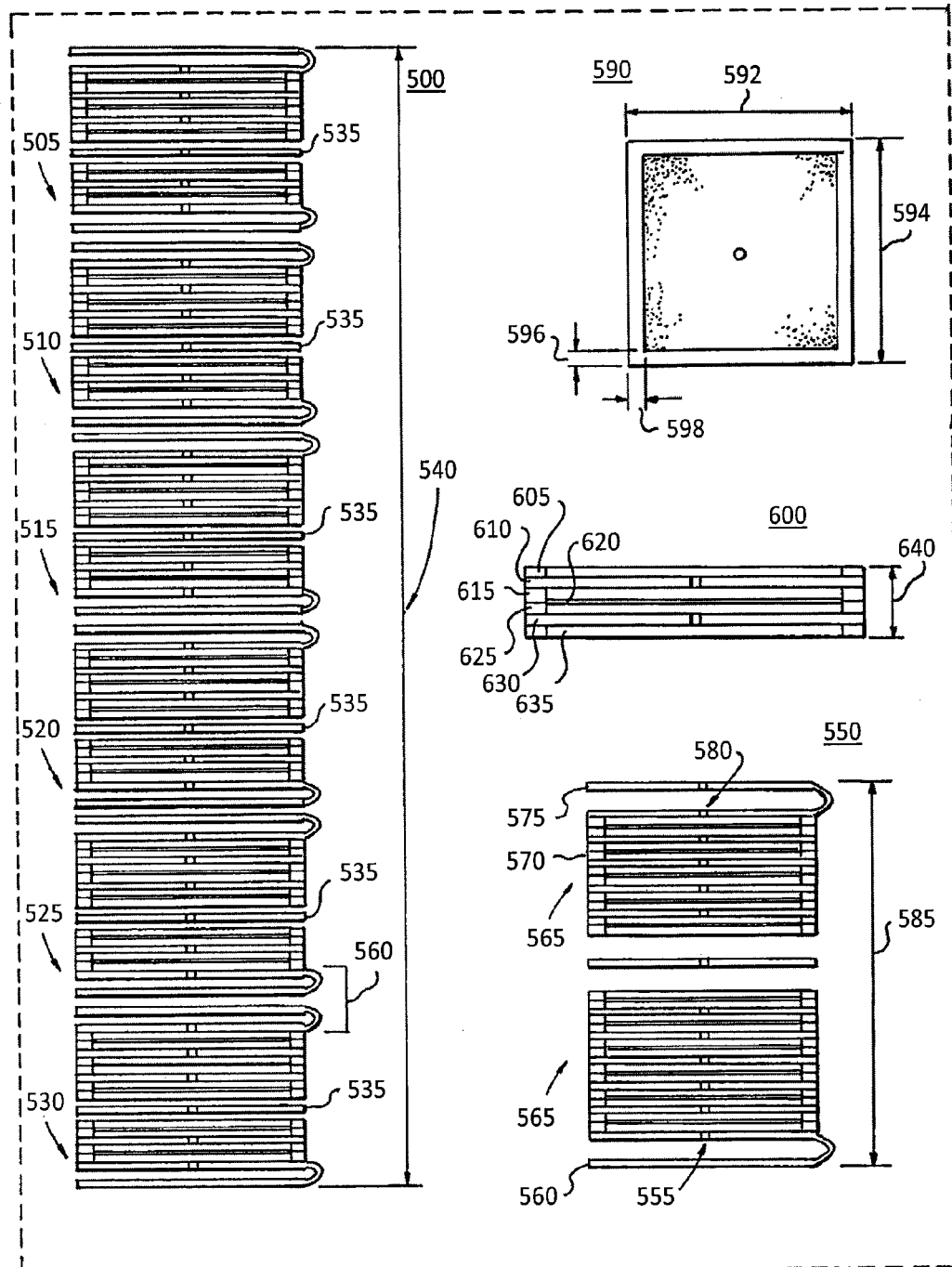
FIG. 6 is a schematic view of the detailed high voltage EDLC identifying all the block components of the stack.

The resultant cascading of blocks attached into one series stack can be seen in FIG. 6. The complete invention example assembly 500 has 58 farads of capacitance rated at 15 volts. Identified by the reference numbers 505-530, each of the six blocks is shown having equal capacitance and structure. The total voltage 540 is limited to the number of blocks within the structure and the electrolyte. The electrolyte may be, but is not limited to, $TEABF_4$/acetonitrile or TEABF4/propylene carbonate and TEMABF4/acetonitrile or $TEABF_4$/propylene carbonate. The block voltage limits 550 can be either 2.7 or 2.5 volts in respect to the above electrolytes.

The electrode component 590 is 50 mm in width 592 and 50 mm in height 594. The PVDF homopolymer on the perimeter 596, 598 is no wider than 5 mm in either direction. A nominal thickness for one electrode 590 is 162 μm which includes double sided active carbon mix and the aluminum current collector. Measuring the surface area using the technique disclosed in co-pending patent application Ser. No. 12/151,811, activated carbon mix and the amount of material used, the specific capacitance can be resolved. From the above information the calculated capacitance=working volume of electrodes×specific capacitance, for one electrode assembly in this example is 10.14 farads.

One electrode assembly 600 shows the individual layers and the actual sequence of placement. From the top, one electrode 605, 610, 615 having both sides activated carbon coated, is disposed on top of the aluminum current collector, adjacent to a separator 620 then the second electrode 625, 630, 635 having both sides activated coated, is disposed on top of the aluminum current collector, and constitutes the complete assembly. From FIG. 1, the nominal thicknesses 605-635 can be obtained and summarized, having a total electrode assembly thickness result 640 of 357 μm or 0.357 mm.

One block or voltage segment 550 shows the 35 components of each electrode or the 70 total electrode components needed for the 350 farad block assembly. The total resulting thickness of the block 585 is a nominal 12.6 mm. Each end of the voltage segment has an aluminum current collector component extension 560, 575. This is the same as FIG. 5, showing the interface 415, 420 between blocks and the ends of the whole stack. Each stack end has a different electrode polarity extending out, thereby forming the series connectivity.

The centers of each of the electrodes have specific hole locations so that they are all equally aligned to each other 555, 580 in a direction corresponding to the lateral outline. These are the electrolyte fill areas, one side being the fill in and the other side being the fill out, or vice versa as described previously. Once an individual block has been filled with electrolyte, the holes are plugged with a PVDF homopolymer and sealed, leaving a uniform finish on the surface. Each block section is similarly filled with electrolyte until the total stack is completed. Since each block is mechanically and electrically temporarily fitted, preliminary tests for acceptance, such as capacitance and voltage withstanding, can be measured.

Figure 7:
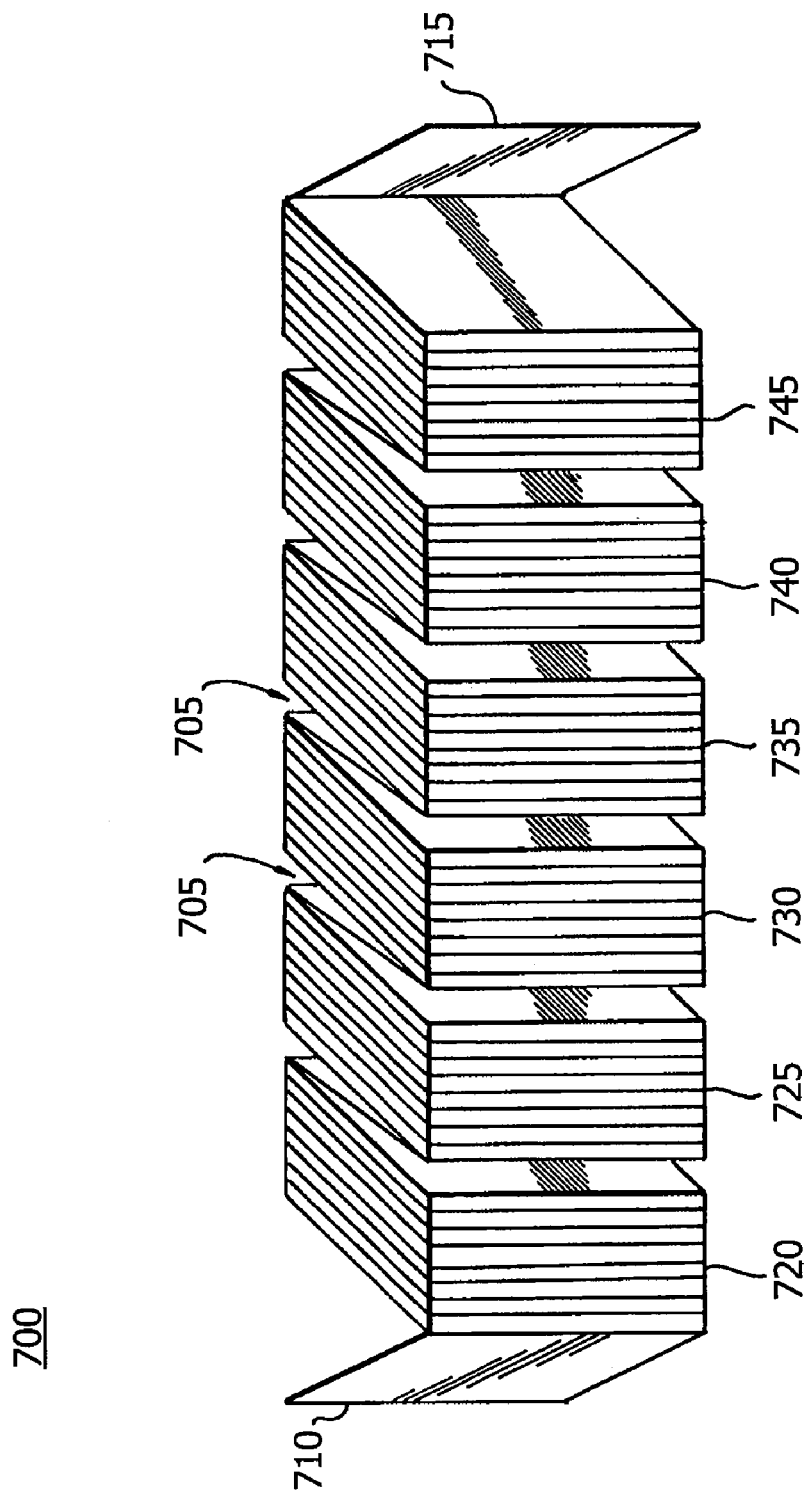
FIG. 7 shows a high voltage EDLC structure, indicating the relationship of the major high voltage body parts with each other.

A semifinal view of the complete example high voltage stack 700 (FIG. 7), including the extended electrical end current collector components, negative 710 and positive 715, voltage segment interfaces 705, capacitive block sections 720-745 are shown in exploded detail. As the high voltage EDLC is operating, continued power cycling generates unwanted heat within the structure. The inventive process provides an efficient thermal heat transfer mechanism from which internally heated mass is removed to an exterior, cooler environment.

Figure 8:
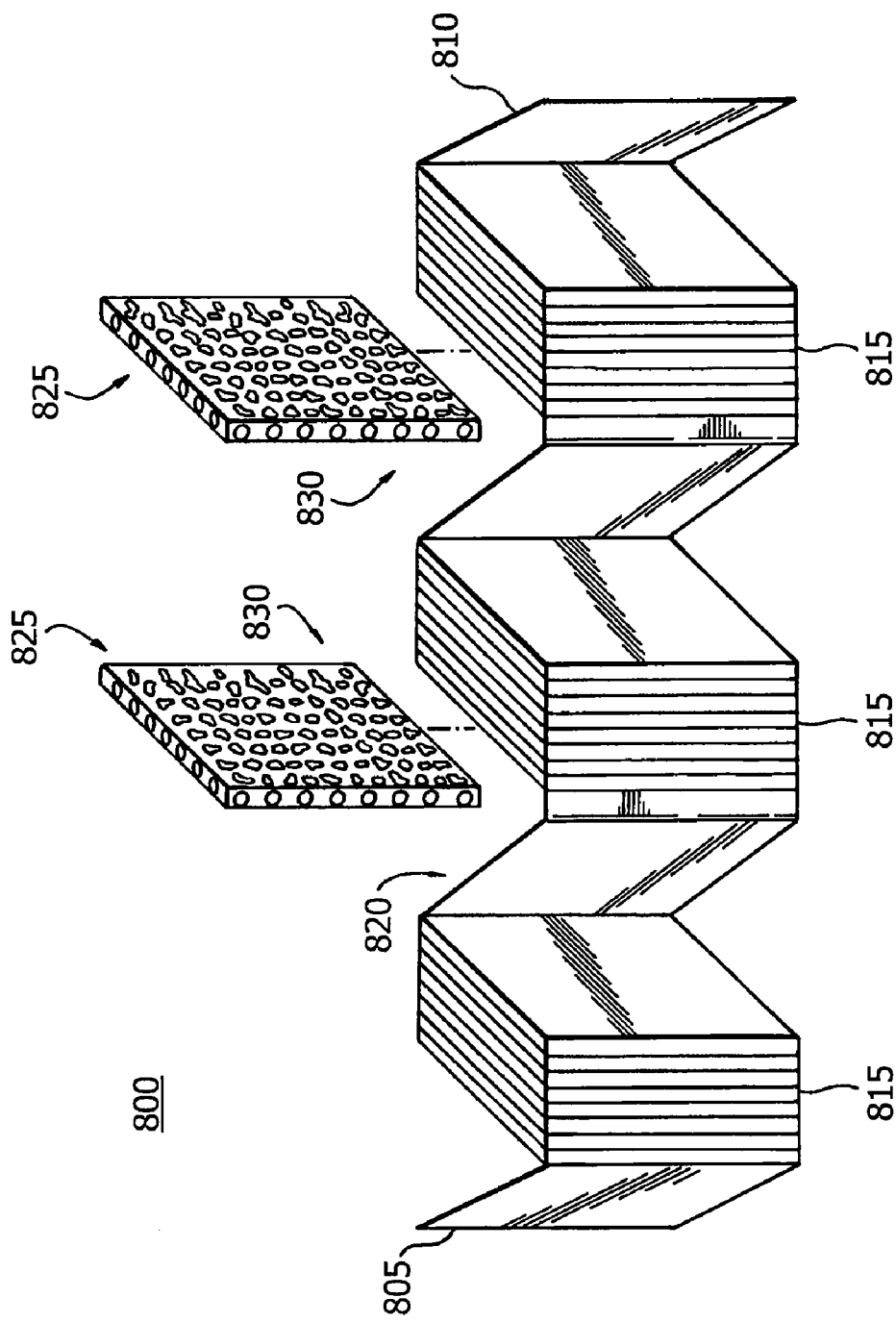
FIG. 8 shows an additive structure into a simplified high voltage EDLC for allowing thermal transfer between voltage segments, allowing greater current capacity.

Devices 800 (FIG. 8) are installed at the intersections of the voltage segment interface 820. A very thin porous and thermally efficient conductive transfer material, such as a conductive epoxy, is prefabricated to help direct and dissipate unwanted heat. The heat dissipaters are added when an application requires either continual power cycling or a high level of deep drawn voltage surges requiring large masses of charged ionic particles to migrate between the EDLC's double layers.

Expanding upon the need to thermally dissipate unwanted heat within the electrode assembly, existing exposed areas of each electrode can be made to dissipate heat. Since in the formation of each laminated cell structure, the 90 degree offset folding scheme described in FIG. 3, as well as with the two exposed edges shown in FIG. 7, create a unique natural thermal dissipater. These exposed aluminum side ended areas conduct internally generated heat into the containment shell shown in FIG. 9.

Figure 9:
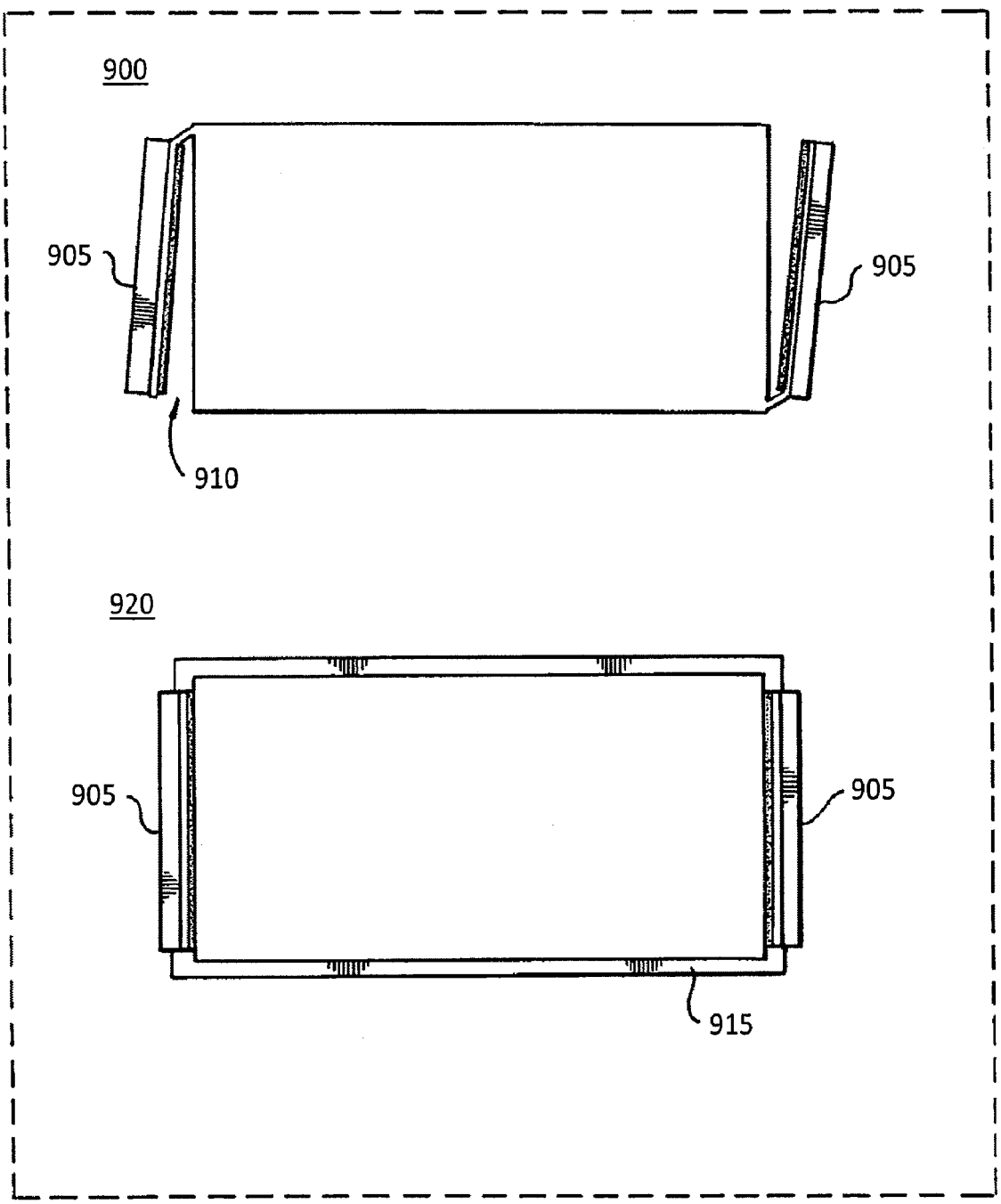
FIG. 9 is a simplified pictorial view of the final high voltage design packaging outline and polarity pole end pieces.

The complete stack can now be compressed into its final form, allowing the electrical end components to remain free. The aluminum current collector components that remain on the left and right sides for terminal connection are connected by sonic or electrical spot welding to preformed terminal plates or pole pieces. As can be seen in FIG. 9, the complete assembled stack 900 includes the welded pole pieces 905. These terminal plates are part of the package design 915 and are constructed to allow a high density polyethylene (HDPE) to be formed around the peripheral surface to ensure an airtight seal of the complete package. Aluminum or stainless steel pole pieces are used to solidify the ends into a final package, allowing the EDLC components to electrically gain access through the packaging. The solid pole pieces help commute the internal heat buildup from the inside to the outside of the package.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An electrochemical double layer capacitor comprising a unit cell structure comprising alternately interleaved electrodes formed lithographically and a preformed separator disposed between said electrodes and impregnating an electrolyte therein, wherein said unit cell comprises preformed electrodes having contained individual components specific to each electrode sequentially, wherein at least one component of each electrode is formed from a PVDF material providing a gasket type composite from a screening machine formed on a surrounding perimeter of capacitor grade aluminum.

2. The electrochemical double layer capacitor in accordance with claim 1, wherein said separator is formed lithographically in conjunction with an electrode manufacturing process.

3. The electrochemical double layer capacitor in accordance with claim 1, wherein upon an application of surge voltage, an operating voltage of a single unit cell of the electrolyte breakdown voltage can be exceeded at least one time depending on the number of capacitive unit blocks interfaced.

4. The electrochemical double layer capacitor in accordance with claim 1, comprising an active material; a Ketjen Black used as a conductive material; a binder comprising a polymer emulsion dispersed in water and a water-soluble polymer mixture; and a surfactant for enhancing fluidity of a slurry, formed of said Ketjen Black mixed with said binder.

5. The electrochemical double layer capacitor in accordance with claim 1, further comprising cast activated carbon components having a uniform dispersion.

6. The electrochemical double layer capacitor in accordance with claim 1, wherein said electrodes comprise lithographic components placed in precise intervals to develop a double layer effect.

7. The electrochemical double layer capacitor in accordance with claim 1, wherein at least one component of said electrode is formed from a PVDF material utilizing a screening machine building a component proton conductor or separator material to predetermined requirements.

8. The electrochemical double layer capacitor in accordance with claim 1, further comprising a hole centered to penetrate equidistantly though a block so that an electrolyte impregnates said block, saturating said porous carbon material and said separator.

9. The electrochemical double layer capacitor in accordance with claim 1, whereby capacitance is increased by adding increased amounts of components in parallel, as said components are stacked or folded on top of one another.

10. The electrochemical double layer capacitor in accordance with claim 1, further comprising extensions of individual blocks containing additive capacitance, interfaced by one of the group: allowing extra lengths of current collector to one of the electrodes and continuing forward with component placement; sonic welding; and heat (spot) welding said extension pieces together.

11. The electrochemical double layer capacitor in accordance with claim 10, wherein said external electrical connections are connected to pole pieces by welding to provide minimum contact resistance.

12. The electrochemical double layer capacitor in accordance with claim 1, wherein one of said electrodes have a mass-free aluminum extension component leads into the next block, thereby increasing the total withstanding operating voltage of said high voltage cell stack structure.

13. The electrochemical double layer capacitor in accordance with claim 12, wherein said electrolyte comprises a solvent comprising acetonitrile which salt comprises at least one of the group: $TEABF_4$ and $TEMABF_4$.

14. The electrochemical double layer capacitor in accordance with claim 12, wherein said electrolyte comprises a solvent comprising a propylene carbonate, which salt comprises at least one of the group: $TEABF_4$ and $TEMABF_4$.

15. The electrochemical double layer capacitor in accordance with claim 14, wherein said electrode component structure material comprises two different types of material chosen from the group: activated carbon and a transition metal oxide comprising $MnO_2$.

16. The electrochemical double layer capacitor in accordance with claim 1, wherein said electrode component structure comprises asymmetrical compounds.

17. The electrochemical double layer capacitor in accordance with claim 1, further comprising a high density polyethylene (HDPE) package insensitive to said electrolyte injection molded to a predetermined shape of the high voltage device.

18. The electrochemical double layer capacitor in accordance with claim 1, further comprising constructive material boundaries that divert thermal buildup within and including areas around the capacitive blocks, said constructive materials being placed between affected voltage interface sections.

19. The electrochemical double layer capacitor in accordance with claim 1, wherein said electrodes comprise areas free from material leading to the electrochemistry of said cell, from which thermal energy is dissipated.

20. The electrochemical double layer capacitor in accordance with claim 19, wherein said EDLC comprises exposed aluminum free from the electrochemistry of said cell, said aluminum interfacing each cell, each of said electrodes being offset by 90 degrees to contact the exterior container of said cell in order to dissipate unwanted heat.

21. The electrochemical double layer capacitor in accordance with claim 1, wherein said separator is mechanically inserted between said electrodes.

22. An electrode assembly for an electrochemical double layer capacitor, comprising:
  a) a first electrode having an upper surface and a lower surface, both of said first electrode surfaces being coated with activated carbon, at least a portion of said first electrode is formed from a PVDF material providing a gasket type composite from a screening machine formed on a surrounding perimeter of capacitor grade aluminum;
  b) a first aluminum current collector proximate said first electrode;
  c) a separator proximate said first aluminum current collector;
  d) a second electrode having an upper surface and a lower surface, both of said second electrode surfaces being coated with activated carbon, said second electrode proximate said separator, at least a portion of said second electrode is formed from a PVDF material providing a gasket type composite from a screening machine formed on a surrounding perimeter of capacitor grade aluminum; and
  e) a second aluminum current collector proximate said second electrode.

* * * * *